United States Patent Office 2,793,225
Patented May 21, 1957

2,793,225
PROCESS FOR PREPARING PHOSPHONIC ACID ESTERS

Carleton B. Scott, Pomona, Calif., assignor to Union Oil Company of California, Los Angeles, Calif., a corporation of California No Drawing. Application August 19, 1955, Serial No. 529,567

7 Claims. (Cl. 260—461)

This invention relates to phosphonic acid esters, and in particular concerns a novel process for preparing dialkyl esters of alkane-phosphonic acids in which the alkane group contains an alkyl ether or thioether substituent.

In my copending application, Serial No. 524,275, filed July 25, 1955, it is disclosed that alkylene oxides may be employed to oxidize primary trialkyl phosphites to the corresponding primary trialkyl phosphates, the alkylene oxide being simultaneously reduced to the corresponding olefine. The present invention is based on the discovery that when the trialkyl phosphite is one in which at least one of the alkyl groups is a secondary or tertiary alkyl group the reaction takes an entirely different course. Specifically, I have found that when a trialkyl phosphite containing one or more secondary or tertiary alkyl groups is reacted with an alkylene oxide the phosphorous atom is oxidized to the pentavalent state but the alkylene radical attaches itself directly to the phosphorus atom and the secondary or tertiary alkyl group migrates to the alkylene radical, thereby giving rise to a dialkyl ester of a beta-alkoxy-alkane-phosphonic acid. A similar reaction occurs with alkylene sulfides. The general reaction may thus be described by the equation:

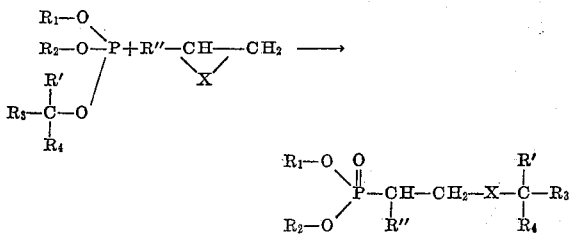

wherein:
$R_1$, $R_2$, $R_3$ and $R_4$ = alkyl.
$R'$ = Hydrogen or alkyl.
$R''$ = Hydrogen or alkyl containing 1–4 carbon atoms.
$X$ = Oxygen or sulfur.

The products obtained by the above reaction are useful as intermediates in the preparation of lubricating oil additives and surfactants, as plasticizing or softening agents for synthetic resin compositions, and as insecticides and fungicides. They vary in physical form from viscous light-colored liquids to resinous solids and are for the most part distillable only under high vacuum. They are substantially insoluble in water but are soluble in common organic solvents, e. g. acetone, benzene, ether, etc.

The following tabulation lists possible reactants and products within the scope of the invention but is not to be construed as limiting the same:

| Phosphite Reactant | Alkylene Oxide or Sulfide Reactant | Product |
|---|---|---|
| Dimethyl isopropyl | Ethylene oxide | Dimethyl $\beta$ - isopropoxy-ethane-phosphonate. |
| Diethyl isopropyl | Propylene oxide | Diethyl $\alpha$ - methyl - $\beta$ - isopropoxy - ethane - phosphonate. |
| Tri-isopropyl | Ethylene sulfide | Di - isopropyl $\beta$ - (thio - isopropyl) - ethane - phosphonate. |
| Di-n-propyl-tert.-butyl | Butylene oxide | Di - n - propyl $\alpha$ - ethyl - $\beta$-tert. - butoxy - ethane - phosphonate. |
| Tri-sec.-butyl | Butylene sulfide | Di - sec. - butyl $\alpha$ - ethyl-$\beta$ - (thio - sec. - butyl)-ethane-phosphonate. |
| Methyl di-sec.-butyl | Butyl-ethylene oxide | Methyl sec.-butyl $\alpha$-butyl-$\beta$ - sec. - butoxy - ethane-phosphonate. |
| Di-n-butyl tert.-octyl | Ethylene sulfide | Di - n - butyl $\beta$ - (thio - tert. - octyl) - ethane - phosphonate. |
| Tri-sec.-amyl | Butylene oxide | Di - sec. - amyl $\alpha$ - ethyl - $\beta$-sec.-amyloxy-ethane-phosphonate. |
| Tri-tert.-amyl | Ethylene oxide | Di - tert. - amyl $\beta$ - tert. - amyloxy - ethane - phosphonate. |
| Diethyl-sec.-octyl | Propylene sulfide | Diethyl $\alpha$ - methyl - $\beta$ - (thio - sec.-octyl)-ethane-phosphonate. |
| Tri-tert.-octyl | Butylene oxide | Di - tert. - octyl $\alpha$ - ethyl - $\beta$-tert. - octyloxy-ethane-phosphonate. |
| Di-lauryl isopropyl | Propyl-ethylene sulfide | Di - lauryl $\alpha$ - propyl - $\beta$ - (thio - isopropyl)-ethane-phosphonate. |
| Tri-(tri-n-propyl-methyl) | Ethylene oxide | Di - (tri - n - propylmethyl) $\beta$-tri - n-propylmethoxy - ethane-phosphonate. |
| Di-n-butyl sec.-hexyl | Propylene oxide | Di - n - butyl $\alpha$ - methyl - $\beta$ - sec. - hexyloxy-ethane-phosphonate. |
| Dimethyl sec.-decyl | Ethylene sulfide | Dimethyl $\beta$ - (thio - sec. - decyl)-ethane-phosphonate. |

In reacting a trialkyl phosphite of the present class with an alkylene oxide or sulfide in accordance with the invention, the two reactants are simply admixed and heated to a reaction temperature between about 100 and about 200° C. under autogenic pressure. Certain of the alkylene oxides and sulfides are quite volatile, and the pressure initially developed at the reaction temperature may be as high as 1500 p. s. i. g. or higher. Accordingly, the reaction is carried out in a pressure vessel such as an autoclave or rocking bomb. As the reaction proceeds the alkylene oxide or sulfide is consumed and the pressure within the reaction vessel gradually decreases. Accordingly, completion of the reaction is indicated by the pressure falling to some low fixed value. Usually, the reaction is complete in from about 0.5 to about 8 hours, depending upon the particular reactants involved and the temperature employed. The reactants may be employed in substantially equimolecular proportions although an excess of the alkylene oxide or sulfide reactant may be provided to insure complete consumption of the phosphite reactant. If desired, the reaction may be carried out in the presence of an inert liquid reaction medium, e. g., benzene, toluene, etc. Upon completion of the reaction, the reaction vessel and contents are cooled to room temperature, the vessel is vented to take off any volatile by-products, and the crude reaction product is purified by fractional distillation under vacuum. When the trialkyl phosphite reactant contains one or more tertiary alkyl groups (i. e., when R' in the foregoing equation represents an alkyl group) the reaction product consists essentially of a phosphonic acid ester of the present class. However, when the phosphite reactant contains only secondary (or both primary and secondary) alkyl groups, the reaction product may contain appreciable amounts of the corresponding trialkyl phosphate or thiophosphate, i. e., the alkylene oxide or sulfide tends to act as an oxidizing agent as described in my aforesaid copending application. This is believed to be due to the fact that secondary alkyl groups are not as mobile as tertiary alkyl groups and hence do not migrate as readily to the beta carbon atom of the alkylene oxide or sulfide. Accordingly, best yields of phosphonic acid esters are obtained when the trialkyl phosphite reactant contains one or more tertiary alkyl groups, and when such reactant contains only secondary alkyl groups a mixed product is obtained. Such product, however, can readily be resolved by fractional distillation under high vacuum. Usually, the phosphonate ester component of such mixed product is the higher boiling.

The following examples are illustrative of the practice of the invention, but are not to be construed as limiting the invention:

Example I

Approximately 166 parts by weight (0.8 mole) of tri-isopropyl phosphite and 35 parts by weight (0.8 mole) of ethylene oxide are charged to a rocking autoclave and heated at an average temperature of about 170° C. for 1.5 hours. During the heating the pressure within the autoclave rapidly rises to about 1200 p. s. i. g. and then gradually declines to about 500 p. s. i. g. The autoclave is cooled and vented to the atmosphere, and the liquid reaction product is then removed and fractionally distilled under vacuum  There is obtained an initial low-boiling fraction (probably comprising unreacted ethylene oxide), a fraction comprising tri-isopropyl phosphate, a fraction consisting of di-isopropyl β-isopropoxy-ethane-phosphonate, and a small distillation residue. The phosphonate ester product is a viscous colorless liquid distilling at 125°–130° C. under 10 mm. pressure and having the structural formula:

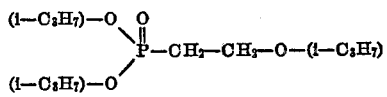

Example II

An equimolecular mixture of propylene oxide and tri-tert.-butyl phosphite is dissolved in an equal volume of benzene and heated at 135° C. for 2 hours under autogenic pressure as in Example I. The benzene is evaporated from the reaction product, and the latter is then fractionally distilled under vacuum to obtain di-tert.-butyl α-methyl-β-tert.-butoxy-ethane-phosphonate having the structural formula:

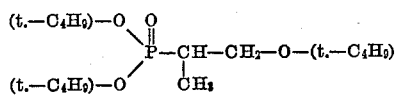

Example III

An equimolecular mixture of dimethyl sec.-amyl phosphite and ethylene sulfide is heated at 190° C. for 4 hours under autogenic pressure as in Example I. Upon fractionally distilling the reaction product there is obtained dimethyl sec.-amyl thiophosphate and dimethyl β-(thio-sec.-amyl)-ethane-phosphonate. The latter has the structural formula:

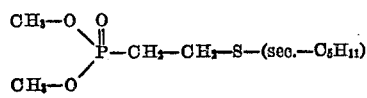

Other modes of applying the principle of my invention may be employed instead of those explained, change being made as regards the methods or materials employed, provided the step or steps stated by any of the following claims or the equivalent thereof be employed.

I, therefore, particularly point out and distinctly claim as my invention:

1. The process for preparing alkyl esters of beta-substituted ethane-phosphonic acid which comprises heating a trialkyl phosphite of the general formula:

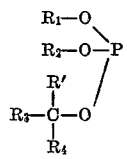

wherein $R_1$, $R_2$, $R_3$ and $R_4$ each represents an alkyl radical and R' represents a substituent selected from the class consisting of hydrogen and alkyl radicals, and an alkylene compound of the general formula:

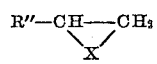

wherein R'' represents a substituent selected from the class consisting of hydrogen and alkyl radicals containing from 1 to 4 carbon atoms and X represents a bivalent element selected from the class consisting of oxygen and sulfur, at a reaction temperature between about 100° and about 200° C. under autogenic pressure.

2. A process according to claim 1 wherein the said trialkyl phosphite and alkylene compound are heated in the presence of an inert liquid reaction medium.

3. A process according to claim 1 wherein X represents oxygen.

4. A process according to claim 1 wherein R' represents an alkyl radical.

5. A process according to claim 1 wherein R' represents hydrogen.

6. The process for preparing alkyl esters of beta-alkoxy-ethane-phosphonic acid which comprises heating a trialkyl phosphite of the general formula:

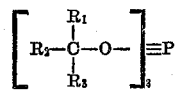

wherein $R_1$, $R_2$ and $R_3$ each represents an alkyl radical, with an alkylene oxide of the general formula:

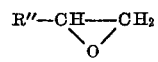

wherein R'' represents a substituent selected from the class consisting of hydrogen and alkyl radicals containing from 1 to 4 carbon atoms, at a temperature between about 100° and about 200° C. and under autogenic pressure, and thereafter recovering from the reaction product an ester having the general formula:

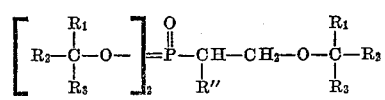

7. The process for preparing alkyl esters of a beta-alkoxy-ethane-phosphonic acid which comprises heating a trialkyl phosphite of the general formula:

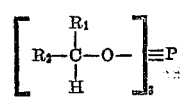

wherein $R_1$ and $R_2$ each represents an alkayl radical, with an alkylene oxide of the general formula:

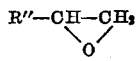

wherein $R''$ represents a substituent selected from the class consisting of hydrogen and alkyl radicals containing from 1 to 4 carbon atoms, at a temperature between about 100° and about 200° C. and under autogenic pressure, and thereafter recovering from the reaction product an ester having the general formula:

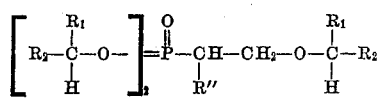

No references cited.